No. 619,696. Patented Feb. 14, 1899.
H. W. ROBY.
BICYCLE SUPPORT OR REST.
(Application filed June 21, 1897.)
(No Model.) 2 Sheets—Sheet 1.
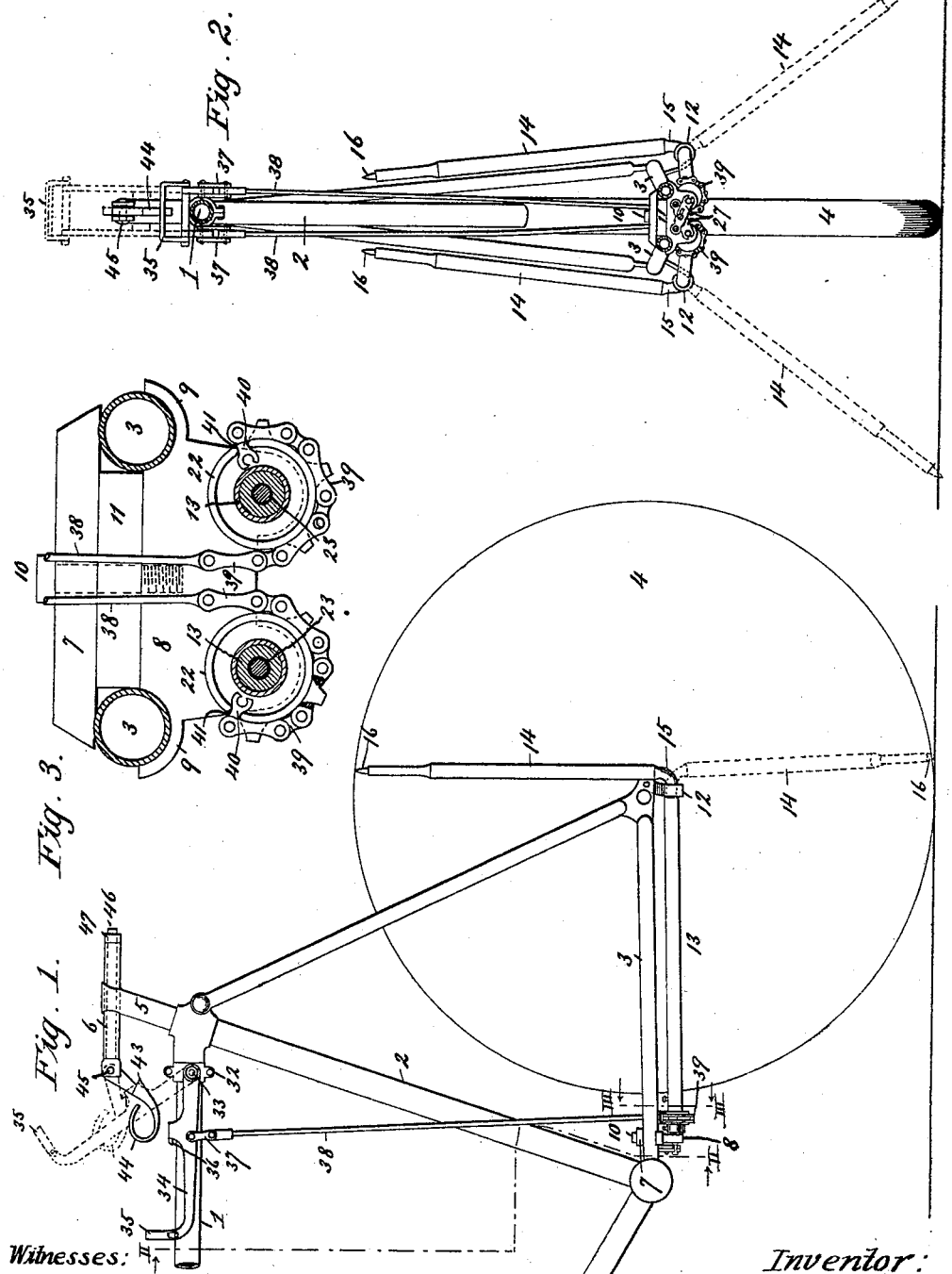
Witnesses:
Inventor:
Henry W. Roby
By Higdon & Higdon
Attys.

No. 619,696. Patented Feb. 14, 1899.
H. W. ROBY.
BICYCLE SUPPORT OR REST.
(Application filed June 21, 1897.)
(No Model.) 2 Sheets—Sheet 2.
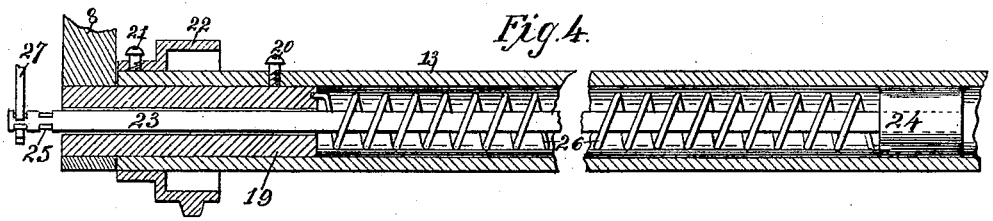
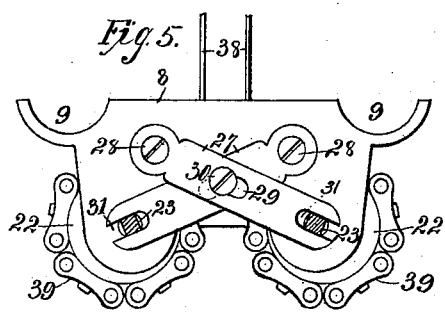
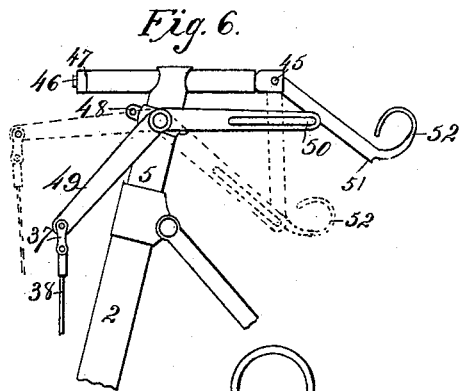
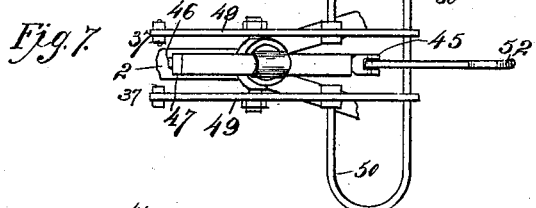
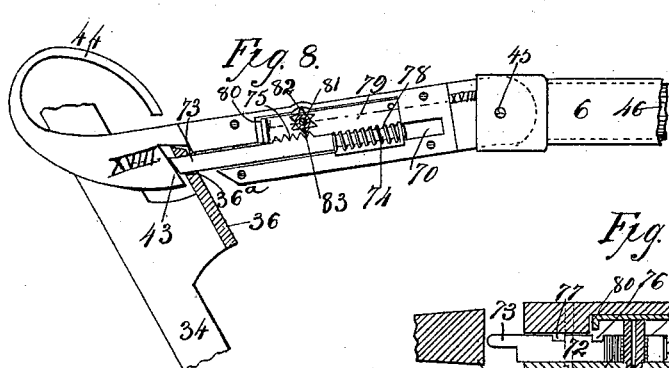
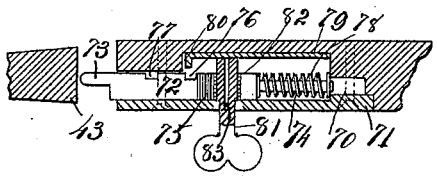
Witnesses:
G. F. Bartholomees.
M. R. Remley.
Inventor
Henry W. Roby
By Higdon & Higdon
Att'ys
THE NORRIS PETERS CO., PHOTO-LITHO., WASHINGTON, D. C.

UNITED STATES PATENT OFFICE.

HENRY W. ROBY, OF TOPEKA, KANSAS, ASSIGNOR OF ONE-HALF TO L. L. ROBY, OF SAME PLACE.

BICYCLE SUPPORT OR REST.

SPECIFICATION forming part of Letters Patent No. 619,696, dated February 14, 1899.

Application filed June 21, 1897. Serial No. 641,553. (No model.)

*To all whom it may concern:*

Be it known that I, HENRY W. ROBY, of Topeka, Shawnee county, Kansas, have invented certain new and useful Improvements in Bicycle Supports or Rests, of which the following is a full, clear, and exact description, reference being had to the accompanying drawings, forming a part thereof.

My invention relates to bicycle supports or rests.

The primary object of the invention is to produce a device of this character whereby an unskilled rider or a novice may, as well as an expert, stop and yet maintain his bicycle in an upright position without dismounting or by which the bicycle may be supported until one gets comfortably seated and then may be thrown quickly and easily to an inoperative position as the bicycle is propelled forward.

A further object of the invention is to produce a device of this character which may serve as an aid to a beginner or one learning to ride in order that he or she may become accustomed to the "balance" of the bicycle without danger of a fall in mounting or dismounting and without requiring the assistance of other parties.

A still further object of the invention is to produce a device of this character which may be employed with equal convenience and facility in connection with a "diamond" or "drop" frame bicycle and which while positive and reliable in action is simple, strong, durable, and inexpensive of manufacture.

With these objects in view the invention consists in certain novel and peculiar features of construction and combinations of parts, as will be hereinafter described and claimed.

In order that the invention may be fully understood, I will proceed to describe it with reference to the accompanying drawings, in which—

Figure 1 represents in side elevation the rear portion of a diamond-frame bicycle provided with a support or rest embodying my invention. Fig. 2 represents a section of the same, taken on the line 11 11 of Fig. 1. Fig. 3 represents on an enlarged scale a cross-section taken on the line 111 111 of Fig. 1. Fig. 4 represents on a still greater scale a longitudinal section of a portion of the support or rest. Fig. 5 represents on an enlarged scale a view similar to Fig. 2, but with the bicycle and part of the support or rest omitted. Fig. 6 represents in side elevation the upper portion of a drop-frame bicycle and the upper part of my support or rest mechanism as adapted thereto. Fig. 7 represents a plan view of the same. Figs. 8 and 9 are views illustrating the mechanism for locking the support or rest in its operative position.

In the said drawings, 1 designates the top bar; 2, the seat-post standard or brace; 3, the rear forks, and 4 the rear or drive wheels of the bicycle.

5 designates the seat-post, and 6 the head-bar of the seat-post, which is preferably tubular, but not necessarily so.

A clamp mounted upon the rear forks adjacent to the hub of the frame comprises the upper member or bar 7, which bears upon said forks, the lower member 8, provided with curved arms 9 for snugly embracing said forks at their lower sides, a clamping-bolt 10, which extends downward through the bar or member 7 and into the member 8, and a member 11, through which said bolt also extends and which is interposed between the members 7 and 8 and the rear forks, as shown clearly in Fig. 3. This construction provides a rigid and substantial clamp.

Depending downward and outward from the frame near the wheel-axle are bearings 12.

The support proper in its preferred form consists of two L or right-angle shaped bars, each comprising a tubular body 13 and a leg or extension 14, said body and leg being united by the curved and diametrically-reduced portion 15, said portions being journaled in bearings 12. The outer or free ends of the legs are preferably armed with points 16, of case-hardened steel or equivalent material, in order that they may when necessary obtain a firm and reliable grasp upon the pavement or other surface.

19 designates tubular plugs which are secured by set-screws 20 rigidly in the front ends of the tubular bars 13, and projecting at their front ends from said bars find a bearing in the member 8 of the clamp hereinbefore described. Secured rigidly upon the front ends of said bars 13, by means of set-screws 21 or their equivalents, are sprocket-wheel drums 22.

23 designates rods which are about half the length of the bars 13 and extend axially thereof. Said bars are provided at their rear ends with enlargements 24, which fit rotatably yet snugly in said bars, and at their front ends find a bearing in and project forward from the tubular plugs 19 and at such projecting ends are squared, as shown at 25, for a purpose which will be hereinafter explained. Spiral springs 26 encircle said rods and are secured at their opposite ends to the enlargements 24 of the rods and to the tubular plugs 19 in order that they may when unopposed utilize said rods as fulcrums, and thereby rotate the bars 13 and throw the legs or extensions to their elevated or inoperative positions, as hereinafter more particularly referred to. To prevent the accidental rotation of said rods 23, and thereby the unwinding of the springs, I employ a lock consisting of a pair of dogs 27. These dogs are mounted at their upper ends upon screws 28, engaging the member 8 of the clamp, and are provided with longitudinal slots 29, engaging a guide-screw 30, also mounted in said clamp member, and with notches 31 in their lower ends, which are adapted to embrace snugly the opposite squared faces of said rods, and thus prevent, as hereinbefore stated, the back rotation or unwinding of the springs. Said rods are provided with two of said squared surfaces, arranged at right angles to each other, in order that when necessary the springs may be more conveniently tensioned—that is to say, may be more readily and conveniently rotated. To accomplish this conveniently, the wheel is inverted and the operator with two small wrenches, something like the dogs 27, alternately engages said squared surfaces and turns said rods one at a time. It is desirable that two such surfaces be provided, owing to the fact that there is only about room enough to swing said wrenches through a quarter of a circle with each operation or manipulation, and consequently it would be difficult to obtain a new grasp upon the rods after each such movement if another surface at right angles to the first were not provided. After said springs are wound sufficiently the dogs 27 are caused to engage one of said squared surfaces and thus prevent their back rotation. Before winding said springs, however, the screws 28 are removed and the dogs slipped back upon the guide-screw 30, the slots 29 permitting such movement. To resecure them and said rods from back rotation, they are adjusted in the opposite direction, with their notched ends engaging the rods until the screws 28 can again be passed through them and secured to the member 8 of the clamp.

32 designates a clamp which is secured upon the top bar 1 of the frame near the seat-post, and 33 trunnions projecting laterally and oppositely therefrom.

A lever 34 comprises a pair of arms which are mounted at their rear ends upon the trunnions 33 and are adapted to operate in a vertical plane close to the sides of said top bar. Said arms are connected at their front ends by a loop 35, which forms a handle for the lever, and about midway their length they are provided or formed integrally with a cross-bar 36. 37 designates a pair of links which are pivoted to said lever and to the upper ends of the parallel rods 38, which are attached at their lower ends to the chains 39, engaging the sprocket-wheel drums 22. As a convenient means for attaching the opposite ends of said chains to said drums they terminate in short links 40, having narrow necks and comparatively large heads. The necks are fitted laterally into notches 41 in said drums, and their enlarged heads prevent their withdrawal under a longitudinal strain, while the fact that the chains engage the sprocket-wheels prevent their lateral disengagement. Thus it will be seen that a simple, cheap, and durable connection is provided between said drums and the chains.

43 designates a dog which is adapted at times to engage the cross-bar 36 of the lever, and 44 designates a handle for said dog, which serves at the same time as a guide for the positive and reliable engagement of said bar and the dog, such engagement taking place automatically, due to the gravitative tendency of the dog, which is arranged to swing downward a predetermined distance—as shown, for instance, in Fig. 1—but no farther. The upper end of said dog is pivoted, as shown at 45, to the front end of a rod 46, which extends through the tubular head-bar of the seat-post and is secured reliably in position by a clamping-nut 47.

To use the support or rest in connection with a lady's or drop-frame bicycle, the style and arrangement of the lever 34 and dog 43 are changed. In this case, as illustrated in Figs. 6 and 7, I preferably mount a clamp 48 upon the seat-post just below the saddle and pivot upon the same the angle-lever 49, which is connected at its front end by the links 37 with the rods 38. The rear end of said lever is provided with an elongated loop 50, so as to provide a convenient handle slightly to the rear and at one or both sides of the seat, which the rider may grasp to throw the support or rest to operative position, so as to support the wheel. This loop also subserves the function of the cross-bar 36 of the lever 34, as it provides a point for engagement of the downwardly-disposed shoulder 51 of the dog 52, pivoted at 45 to the rod 46, as described with reference to the dog 43. Referring first to the preferred form of construction, it will be noticed that when the support or rest occupies its inoperative position the lever 34 is depressed, while the legs 14 are elevated, as illustrated in Figs. 1 and 2. Supposing now the rider desires to stop without dismounting, he slows up, and just a moment before the bicycle is about to topple over he grasps the handle 35 of said lever and pulls it upward. As it rises the cross-bar 36 strikes the guide portion of the swinging dog 43 and forces it upward also until said cross-bar clears the tooth of said dog and is automatically engaged therewith, due to the gravitative tendency of the dog to swing downward. As said lever describes such movement the upward pull upon the chains 39 causes the drums to rotate downward and outward, and consequently against the resistance of the springs 26 rotate the tubular bars 13 correspondingly and cause the legs 14 to assume the position indicated in dotted lines, Fig. 2—that is to say, cause them to act by bearing upon the ground at opposite sides of the rear wheel as lateral braces, which by giving the wheel four points of support render it absolutely impossible for the bicycle to accidentally assume a recumbent position, but positively and reliably support it irrespective of the fact that the rider remains upon the seat or that he dismounts and remounts.

Supposing the rider to be upon the saddle and that he desires to proceed, he simply grasps the handle 44 of the dog 43 and by an upward jerk or pull disengages it from the lever 34. Immediately this takes place the springs 26, fulcruming upon the relatively stationary rods 23, (stationary because locked by the dogs 27,) rotate the tubular bars 13 in the opposite direction to that described and swing their legs back to their inoperative positions.

The mode of operation is practically the same in connection with a lady's bicycle. In this case, however, the rider, reaching downward to the rear end and at one side or the other of the saddle, grasps the loop 50 and depresses the rear end of the lever 49, the dog 51 following such movement, so as to be in position to automatically engage said loop at the instant that the legs 14 have assumed their proper positions as braces of the wheel. To start again, the rider simply reaches to the rear, grasps the handle 52, and swings said dog upward, of course causing its disengagement from the lever. Immediately this is accomplished the springs 26 reëlevate the legs 14 and return the lever to its normal position, as shown in full lines, Fig. 11.

The novice after a little time spent in acquiring confidence and familiarity with the bicycle and with the manipulation of the handle-bar may with one hand grasp the dog 43 or 51, as the case may be, and trip it, so as to permit the springs to swing the legs to their inoperative position. If the bicycle starts to topple over, by quickly pressing downward upon the lever the legs may be swung back instantaneously, so as to brace the machine laterally and prevent it falling. Continued practice of this kind will in a short time enable the beginner to acquire the art of riding without difficulty and without bruises.

The support or rest mechanism constructed and arranged as herein suggested would not increase the weight of the wheel materially and will be protected from dust and considerable wear and the parts from injury to which they are subjected in the exposed position illustrated in the drawings.

As it will be difficult and probably impossible to prevent boys from tampering with and possibly injuring the support or rest mechanism if a bicycle provided therewith be left alone upon the street for a few minutes, it will be desirable to provide some means for locking it in its inoperative position. To this end I have provided a lock for securing the dog 43 and the lever 34 in their operative or engaged position, as illustrated in Fig. 7. The dog 43, inward of the tooth, is formed with a longitudinal recess 70, and a riveted plate 71 covers the same. Within said recess is a sliding bar 72, provided with a bolt extension 73. Said bar has a reduced projection 74 at its rear end and rack-teeth 75 at its upper side. In one of its edges it is provided with the notches 76 and 77 a distance apart corresponding to its operative movement. A spring 78, surrounding the portion 74, tends to continuously advance the bolt, as shown, and a flat spring 79, provided with a tooth 80 at its free end, engages, when the bolt is advanced, the notch 76, except when forced out of engagement therewith by the tubular key 81. Said key is provided with peripheral teeth 82 for engagement with the rack-teeth of the bar and is journaled, when in position, upon the pin 83, projecting rigidly from the dog and through the spring 79 and an opening in the plate 71. To retract the bolt, this key is fitted upon said pin and shoved inward until it pushes the spring back and disengages the tooth 80 from the notch 76, as shown in Fig. 7. At this time its teeth 82 engage the teeth 75 of the bar, and the rotatable operation of the key in the proper direction overcomes the resistance of the spring 70$^a$ and withdraws the bolt from engagement with the hole 36$^a$ of the cross-bar 36 of the lever 34 and permits the dog and lever to be disengaged. As the key is withdrawn the engagement of its teeth with the rack-teeth is maintained until the spring 79 causes its tooth 80 to engage the notch 77 of the bar, and consequently prevent the bolt from being advanced accidentally. It is obvious that this locking mechanism is designed for use in connection with the lever and dog of the lady's wheel, Figs. 6 and 7, it being only necessary to perforate the loop 50 at the proper point and mount the sliding-bolt mechanism in the dog 51. By this arrangement it is obvious that any trouble or disarrangement of the parts due to mischievously-inclined persons will be prevented and that the chances of loss of the wheel by theft will be reduced to the minimum.

It is to be understood, of course, that various changes in the form, proportion, and detail construction and arrangement of parts may be made without departing from the spirit and scope or sacrificing any of the advantages of my invention.

Having thus described the invention, what I claim as new, and desire to secure by Letters Patent, is—

The combination with a bicycle of a support or rest, a lever pivoted to the frame of the bicycle and geared to said support or rest, provided with a perforated cross-bar, a latch-bar pivoted to the seat-post of the bicycle to engage the cross-bar of the lever, and a reciprocatory locking-bolt carried by said latch-bar and adapted for engagement with the aperture of said cross-bar to lock the lever in its operative position, substantially as described.

In testimony whereof I affix my signature in the presence of two witnesses.

HENRY W. ROBY.

Witnesses:
W. S. WILSON,
M. F. CHURCH.